Dec. 27, 1938. E. PLATTER 2,141,695
SAW SET
Filed Oct. 20, 1937
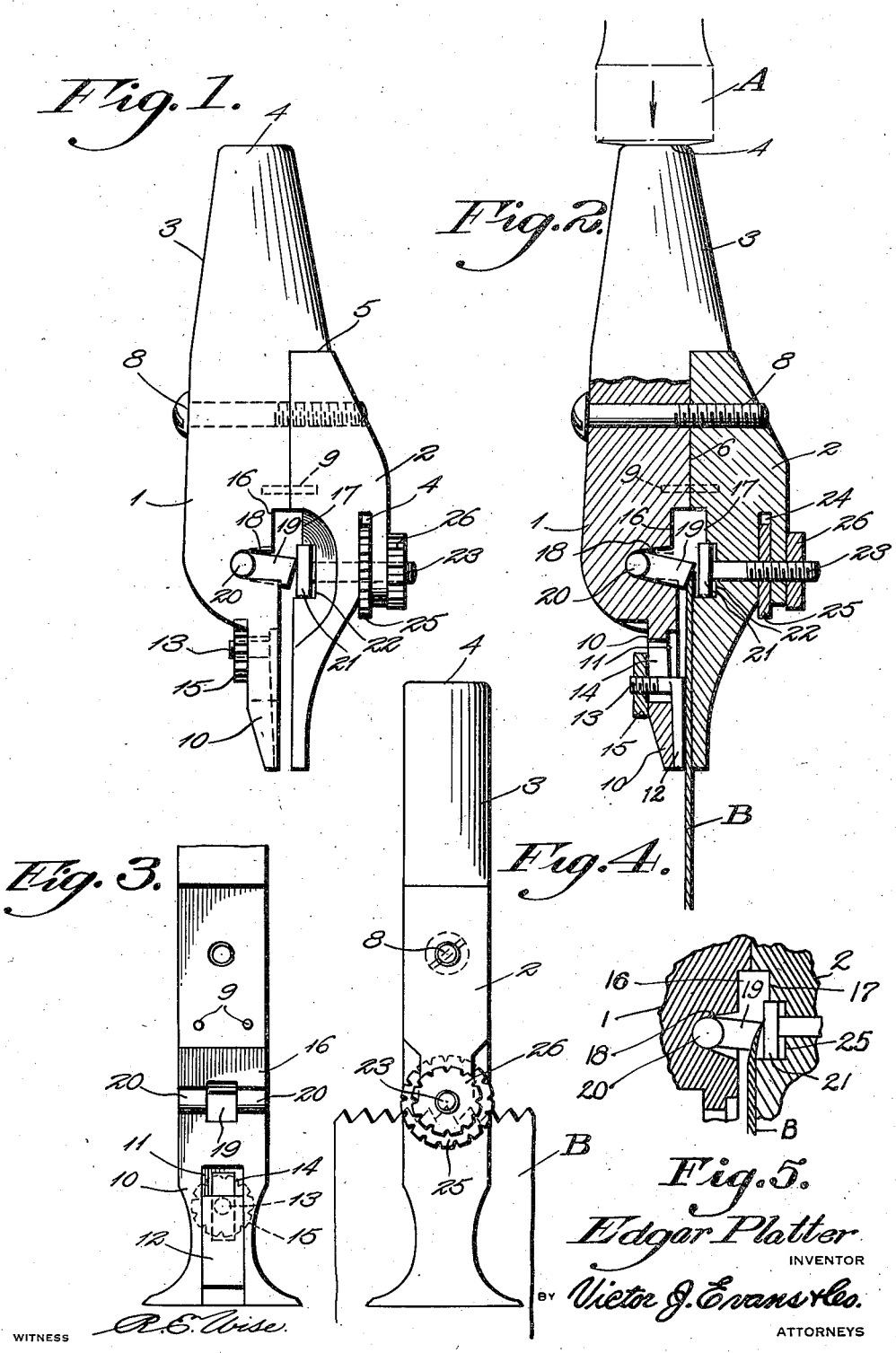
Edgar Platter
INVENTOR
BY Victor J. Evans & Co.
ATTORNEYS Patented Dec. 27, 1938

2,141,695

UNITED STATES PATENT OFFICE 2,141,695

SAW SET

Edgar Platter, Pine Ridge, Oreg.

Application October 20, 1937, Serial No. 170,086

3 Claims. (Cl. 76—72)

This invention relates to saw sets, and its general object is to provide a tool of that character which is capable of use in setting the teeth of practically all types of saws, regardless of the size and thickness thereof, in an easy, expeditious and accurate manner, and with minimum effort on the part of the user.

A further object is to provide a saw set, that is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of the saw set which forms the subject matter of the present invention.

Figure 2 is a view thereof partly in section illustrating the same in use and just prior to the time that the jaw acts to bend or set a tooth.

Figure 3 is a fragmentary view of the headed or jaw carrying section of my saw set and looking toward the inner side thereof.

Figure 4 is an edge view of the saw set in its entirety and looking toward the anvil carrying section thereof.

Figure 5 is a detail sectional view illustrating the position of the jaw after it has bent or set a tooth.

Referring to the drawing in detail, it will be noted that the body of my saw set includes a pair of companion sections, namely a headed or jaw carrying section 1 and an anvil carrying section 2. The body is relatively narrow and the section 1 is longer than the section 2, in that the upper portion 3 thereof is tapered inwardly toward its upper end which terminates in a flat surface to provide a striking head 4 to receive a hammer A or other striking tool, as will be apparent upon inspection of Figure 2. The section 1 is provided with a shoulder 5 at the juncture of the tapered portion therewith and the section 2 has a flat upper end disposed in abutting relation with the shoulder 5, as well as a flat inner face 6 for disposal in face to face contact with the flat inner face 7 of the section 1. The sections are detachably held associated by a screw bolt 8 that extends through the section 1 and is threaded in the section 2, as best shown in Figure 2. Cooperating with the shoulder 5 to prevent longitudinal displacement of the sections with respect to each other, are pins 9 that extend from the face 7 and are received in bores in the section 2 and opening in the face 6 thereof.

The lower portions of each of the sections are reduced and provided with flat confronting faces disposed in spaced relation with respect to each other for receiving a saw blade B between the same, as shown in Figure 2, and the lower portion of the section 1, which is indicated by the reference numeral 10, has a recess 11 in the face thereof. Mounted in the recess for slidable movement is a wedge block 12, to set up a frictional wedging action against the saw blade, in that the inner wall of the recess 11 is inclined inwardly and upwardly to act as a bearing surface for the inner inclined face of the wedge block, while the outer face of the wedge block is flat for frictional engagement with the saw blade, as shown in Figure 2. The recess extends through the lower end of the portion 10, and the wedge block has formed thereon a threaded stud 13 which extends through a slot 14 in the lower portion 10 and threaded thereon is a serrated nut 15 engageable with the outer face of the portion 10 for holding the wedge block in adjusted positions with respect to the saw blade and the latter against the inner face of the section 2, consequently it will be seen that my saw set can be used on saw blades or teeth of various thicknesses.

Between the spaced confronting faces of the sections and the engaged faces thereof, each of the sections is recessed, with the recesses registering with each other to provide a relatively wide chamber that opens through the sides of the sections as suggested in Figure 1. For distinction the recess of the section 1, is indicated by the reference numeral 16, while the recess of the section 2 is indicated by the reference numeral 17, and extending into the section 1 from the recess 16 thereof is an opening 18 that provides a bearing for a hammer or setting jaw 19 that has formed thereon trunnions 20 mounted in the bearing opening for rocking movement. The jaw is of a length to extend into the chamber and the outer face thereof is beveled, for engagement with a saw tooth for setting the same, as suggested in Figure 2.

Mounted in the section 2 for cooperation with the jaw 19 is an anvil 21 that is provided with a seat 22 disposed within the recess 17 and the anvil is movable in the chamber toward and away from the jaw 19 and is held in adjusted position with respect to the jaw. For that purpose, the anvil has formed thereon a threaded stud 23 mounted in and extending through a bore in the section 2, which is slotted as at 24 to provide a chamber 4, for a hand wheel 25 that is threaded on the stud 23 and provided with a serrated outer surface to provide finger gripping means as will be apparent. Upon rotation of the hand wheel 25, it will be obvious that the anvil is adjusted with respect to the jaw 19, and is held in adjusted position by a nut 26 threaded on the stud 23 and engageable with the outer wall of the section 1, as clearly shown in Figures 1 and 2.

From the above description and disclosure of the drawing, it will be apparent that in the use of my tool or saw set, it is disposed on the saw blade B in a manner whereby the outer end of a tooth is arranged between the jaw 19 and the anvil 21, as shown in Figure 2. The wedge block is then set in frictional wedging association with the blade, and thence upon striking the head with a hammer or like tool, the beveled face of the jaw cooperates with the anvil to bend or set the tooth at the desired angle as shown in Figure 5. It will be obvious that upon striking the head 4 that the tool will be forced downwardly on the blade and that the beveled face of the jaw 19 will ride with and against the tooth and bend the same at its juncture with the lower edge of the shoulder provided by the seat 22 for the anvil, the latter acting to limit the bending action of the jaw due to the fact that the upper edge of the tooth engages the same, as clearly shown in Figure 5.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A saw set comprising a body having spaced inner faces to receive a saw blade between the same and a saw tooth receiving chamber at the inner ends of the faces, a tooth engaging jaw mounted for swinging movement in the chamber, an anvil cooperating with the jaw, means for adjusting the anvil with respect to the jaw, a blow receiving head on the body, a wedge block mounted in one of the faces for frictionally clamping the blade between the faces and means for adjusting the wedge block and holding the latter in adjusted positions.

2. A saw set comprising a body having spaced inner faces to receive a saw blade between the same and a saw tooth receiving chamber at the inner ends of the faces, a bearing opening extending into one of the walls of the chamber, a tooth engaging jaw including trunnions rockably mounted in the bearing opening for swinging movement of the jaw in the chamber, an anvil movable in the chamber for cooperation with the jaw, means for adjusting the anvil with respect to the jaw, means for holding the anvil in adjusted positions, one of the faces being recessed, a wedge block mounted for adjustment in the recess and for frictionally clamping the blade between the faces, and means for holding the wedge block in adjusted positions.

3. A saw set comprising companion sections providing a body, a shoulder formed on one of said sections and providing a seat for the other section, means for detachably securing the sections in face to face relation, means cooperating with the shoulder and the securing means to prevent movement of the sections relative to each other, certain portions of the faces being spaced, and the spaced portions extending through the lower end of the body to receive a saw blade between the same, a saw tooth receiving chamber at the upper ends of the spaced portions, a tooth engaging beveled faced jaw mounted on the shouldered section for swinging movement in the chamber, an anvil cooperating with the jaw, a threaded stud formed on the anvil and extending through the other section, a hand wheel on the stud for adjusting the anvil toward and away from the jaw, a lock nut on the stud for securing the anvil in adjusted positions, means for frictionally clamping the blade between the spaced portions, and a blow receiving head at the upper end of the shouldered section.

EDGAR PLATTER.